United States Patent
Proctor et al.

(10) Patent No.: US 8,094,673 B2
(45) Date of Patent: Jan. 10, 2012

(54) CABLE USER INTERFACE

(75) Inventors: David W. Proctor, Bellevue, WA (US); Gregory Sean Cox, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 505 days.

(21) Appl. No.: 11/401,536

(22) Filed: Apr. 10, 2006

(65) Prior Publication Data
US 2007/0237170 A1 Oct. 11, 2007

(51) Int. Cl.
*H04J 3/02* (2006.01)

(52) U.S. Cl. .................. 370/462; 381/327; 381/370

(58) Field of Classification Search .......... 370/200–253, 370/272–309, 431–546; 455/345; 360/137; 381/370, 384, 381, 374, 327, 386; 84/741, 84/743
See application file for complete search history.

(56) References Cited

U.S. PATENT DOCUMENTS

| | | | | |
|---|---|---|---|---|
| 5,420,739 | A * | 5/1995 | Yokozawa et al. | 360/137 |
| 6,396,769 | B1 * | 5/2002 | Polany | 367/131 |
| 6,559,830 | B1 * | 5/2003 | Hinckley et al. | 345/157 |
| 6,600,826 | B1 * | 7/2003 | Xavier | 381/384 |
| 2004/0065187 | A1 * | 4/2004 | Ludwig | 84/645 |
| 2005/0094840 | A1 * | 5/2005 | Harano | 381/381 |
| 2007/0042637 | A1 * | 2/2007 | Bell et al. | 439/502 |
| 2008/0260176 | A1 * | 10/2008 | Hollemans et al. | 381/74 |

FOREIGN PATENT DOCUMENTS

| | | |
|---|---|---|
| JP | 9-74580 | 3/1997 |
| JP | 2001-54185 | 2/2001 |

\* cited by examiner

*Primary Examiner* — Pao Sinkantarakorn
*Assistant Examiner* — Iqbal Zaidi
(74) *Attorney, Agent, or Firm* — Woodcock Washburn LLP

(57) ABSTRACT

A cable user interface, such as a cable for audio headphones, enables control of one or more aspects of operation of a device to which such cable is connected. A user touches/applies pressure to the cable user interface, either along the full length of the cable, or to a localized part of the cable, in order to control the device. A mechanism is included for interfacing the pressure sensitive controller(s) to the device so that pressure/touch applied by a user can be translated to control of the device. In one embodiment, a headphone cable itself is an input device for volume and playback control of a portable media player.

13 Claims, 14 Drawing Sheets

CABLE USER INTERFACE

FIELD OF THE INVENTION

The present invention relates to a cable user interface, such as a cable for audio headphones, that enables control of one or more aspects of operation of a device to which such cable is connected.

BACKGROUND OF THE INVENTION

Computing devices including (a) portable media players (e.g., iPod), such as MP3 players, walkmans, etc., (b) portable computing devices, such as laptops, personal digital assistants ("PDAs"), cell phones, portable email devices (e.g., Blackberry devices), thin clients, portable gaming devices (e.g., portable Playstation, Gameboy), etc., (c) standalone computing devices, such as personal computers ("PCs"), server computers, gaming platforms (e.g., Xbox) mainframes, etc., (d) consumer electronic devices, such as TVs, DVD players, set top boxes, monitors, displays, etc., (e) public computing devices, such as kiosks, in-store music sampling devices, automated teller machines (ATMs), cash registers, etc. and (f) non-conventional computing devices, such as kitchen appliances, motor vehicle controls (e.g., steering wheels), etc., all have one thing in common—other components such as peripherals, headphones, etc. can generally be attached to them to augment input or output characteristics of the computing device.

Often, such peripheral components include either a digital or analog cable, i.e., flexible or bendable signal carrying wire(s) with flexible insulation surrounding the wire(s), with an interface at one end that attaches to the computing device in order to transmit signals carried by the cable to the computing device (e.g., gaming controller signals to control an Xbox game, mouse input to a PC, microphone input to a recording device) and/or receive signals from the computing device to be carried on the cable to a user of the device in some fashion (e.g., display signals received at a monitor, "rumble" feedback received at a gaming controller, audio signals received at speakers).

For an example that can be readily appreciated, portable music players, such as MP3 players and the like, are often used with headphones, which include one or more speakers (usually two, with one for each ear). Headphones generally include an audio interface to the computing device for receiving an audio output signal from the computing device, which audio output signal is then carried over a cable integrated with the audio interface to speaker(s) integrated with the cable at the other end, which causes the speaker(s) of the headset in turn to vibrate at frequencies defined by the audio output signal.

In this regard, a very common behavior is for a user to don the headphones, start playback of a playlist (e.g., an album) by interacting with a user interface of the portable media player, and then to temporarily store the portable media player in a bag, a pocket, etc. while the listener continues with other tasks (e.g., commuting, exercising, shopping, working, etc.), while the cable dangles between the speakers at one end and the bag, pocket, etc. at the other end. However, during the course of these tasks, the user may need to adjust the playback characteristics, including but not limited to the following: Changing volume levels, Muting the volume, Pausing playback, and/or Skipping to the next track.

However, this typically turns out to be somewhat inconvenient. First, to state the obvious, a user must retrieve the device from his or her pocket, bag, etc., which can be inconvenient in and of itself if more than a trivial number things are co-stored with the device. Second, sometimes a user has "locked" the user interface of the portable media player in order to prevent inadvertent interaction with the user interface of the device during playback while it jostles around in the user's pocket, bag, etc. Thus, a user must next disengage any such lock. Then, the user must perform the desired interaction with the portable media player, re-engage any such lock on the user interface, and finally replace the portable media player in the user's bag, pocket, etc.

While such interaction with the device may seem trivial to achieve on a certain level, the truth is anytime the user must retrieve the player from the bag or pocket, interact with the device, and replace the player, such interaction necessarily interrupts any other tasks they are performing. The longer it takes to achieve the desired interaction, the longer the interruption. The more frequent a user needs to make a control adjustment of a pre-determined kind (e.g., volume control) to the device, the more intrusive such interruptions become. In today's complex and rich computing environments, in which emails, cell phone calls, notifications, etc. interrupt our lives enough, any unnecessary interruptions to our lives are simply unacceptable. In addition, the user may be distracted from another more important task (e.g., driving a motor vehicle, writing a novel), and the longer the distraction, the more likely it is that the other important task being performed by the user will be disrupted. For instance, the user may not pay enough careful attention to the task of driving, which can result in a potential disaster, or the user may lose his or her train of thought while writing a novel, which may take additional unknown time to retrieve due to the interruption.

Accordingly, what is needed is ways to effect such control without resorting to the main user interface control of the device itself. One prior art way of addressing this scenario in the headphones context is depicted in FIGS. 1A to 1C. FIG. 1A depicts a conventional set of headphones HP with speakers HP_SP1 and HP_SP2 for outputting sound to a listener. As shown, the speakers HP_SP1 and HP_SP2 are connected to a portable media player PMP via a cable HP_CBL. HP_CBL may be considered any one or more of the bendable signal carrying wires that carry audio signals from the portable media player PMP to the speakers HP_SP1 and HP_SP2. At the end of HP_CBL is a headphone audio interface HP_AI that is typically inserted into a mating interface on the portable media player PMP via the audio interface PMP_AI (not shown in any detail) of the portable media player PMP. As mentioned, to avoid having to directly interface with the main user interface PMP_MCI of the portable media player PMP, alternative, less intrusive techniques are desired.

FIGS. 1B and 1C show one way that this has been addressed in headphones by placing a user adjustable variable resistive component HP_VC for controlling volume of the device away from the computing device, which receives the audio signal being carried prior to its output and attenuates the signal in accordance with a user adjustable wheel. However, as shown in FIG. 1B, the resistive component HP_VC does not involve any interaction with the device PMP, which is agnostic as to the presence of the resistive component HP_VC. In addition, such a technique adds manufacturing overhead because it is an entirely separate component from the cable itself, i.e., to include such a resistive component HP_VC, the cable HP_CBL must be broken into two different cables HP_CBL1 and HP_CBL2. Moreover, once implemented, the functionality imparted by the resistive component HP_VC can never be changed, i.e., component HP_VC will always control the amplitude of the signal carried on HP_CBL1, attenuating the signal to a user-preferred level prior to re-transmitting the signal onto HP_CBL2.

FIG. 1C illustrates a scenario similar to FIG. 1B, except that the resistive component HP_VC is included in the speaker headset itself, e.g., into one of the speakers HP_SP2. While this avoids breaking the cable into two parts, the configuration of FIG. 1C otherwise suffers the same drawbacks. The component adds to manufacturing overhead for the headset, and its functionality is not customizable, i.e., once a volume control, always a volume control.

Thus, at bottom, what is needed is a way to interact with computing devices with respect to the tasks they perform and functionality they impart with minimal interruption. The status quo involves too much interruption, and thus less intrusive methods for interacting with computing devices are needed, especially for control input that is repeated frequently for the context of the device.

SUMMARY OF THE INVENTION

In view of the foregoing, the present invention provides a cable user interface, such as a cable for audio headphones, that enables control of one or more aspects of operation of a device to which such cable is connected. In various embodiments, the user touches/applies pressure to the cable, either along the full length of the cable, or to a localized part of the cable, in order to control the device, thus removing the need for additional buttons or remote control devices. A mechanism is included for interfacing the pressure sensitive controller to the device so that the pressure applied by a user can be translated to control of the device. In one embodiment, a headphone cable itself is an input device for volume and playback control of a portable media player.

Other features of the present invention are described below.

BRIEF DESCRIPTION OF THE DRAWINGS

The cable input device of the invention is further described with reference to the accompanying drawings in which.

DETAILED DESCRIPTION OF ILLUSTRATIVE EMBODIMENTS

As mentioned in the background, the status quo for interacting with computing devices can be intrusive, especially where the task is one that is frequently performed. For instance, volume control for headphones output is a frequently changed characteristic of operation of portable media players. For example, someone may begin speaking to the headphones wearer, usually implicating the need to lower the volume, and then raise the volume again after the conversation finishes. A myriad of other scenarios can also be imagined wherein it would be desirable to be able to quickly perform tasks without resort to the main user interface of the computing device.

Figure 1A:
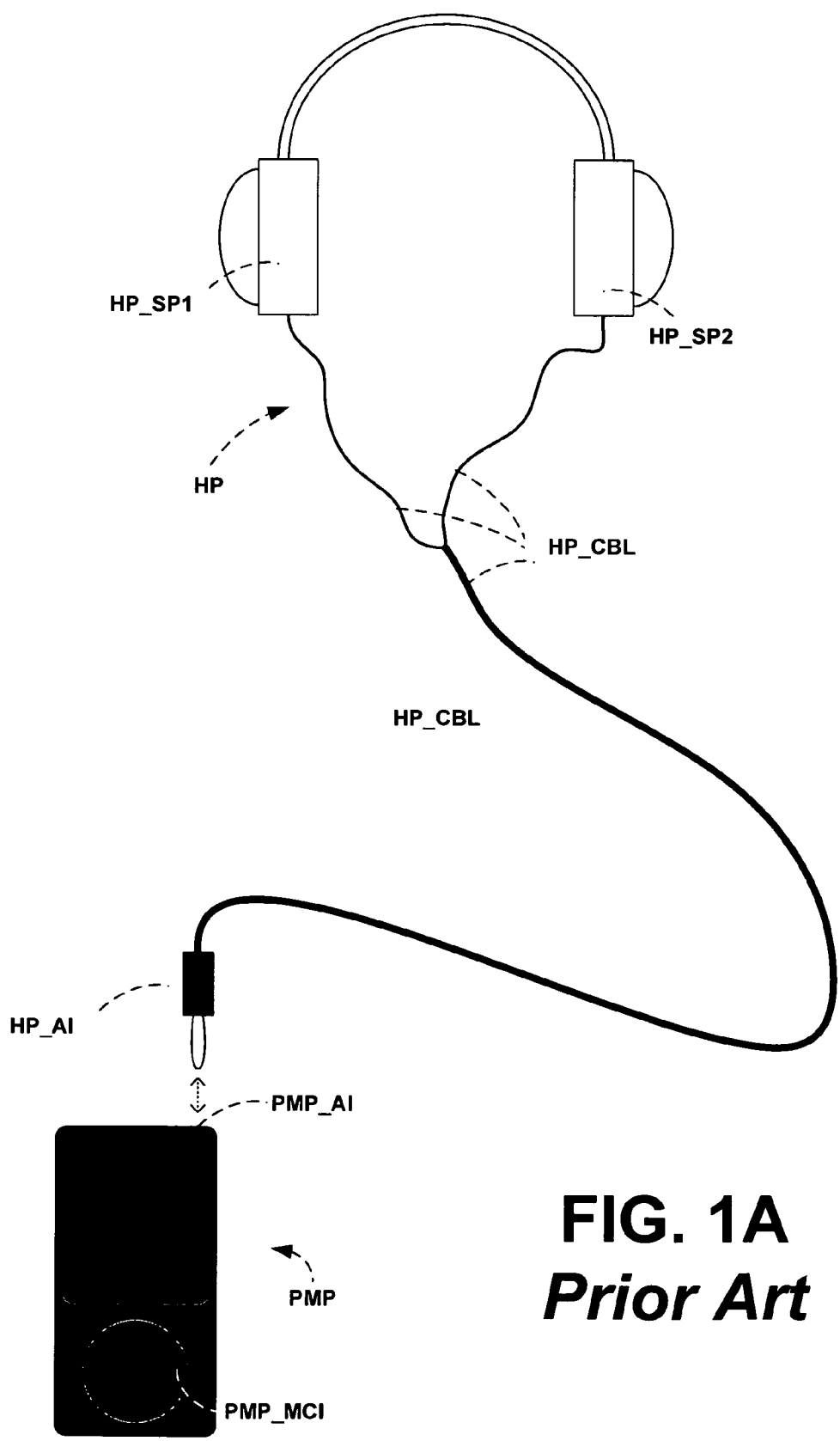
FIGS. 1A, 1B, and 1C illustrate a prior art scenario for including a volume control in a set of headphones to control the level of an audio output.
Figure 1B:
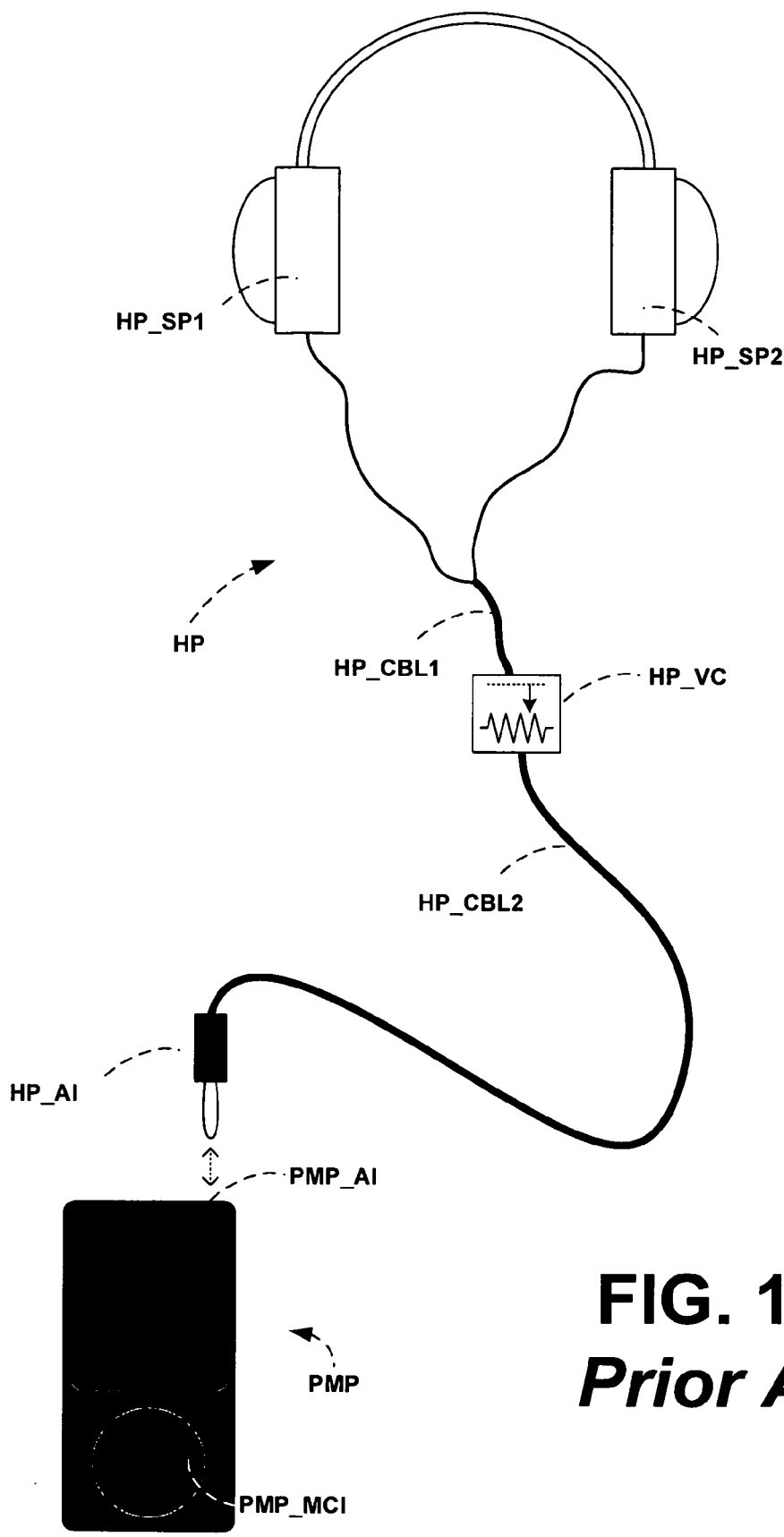
Figure 1C:
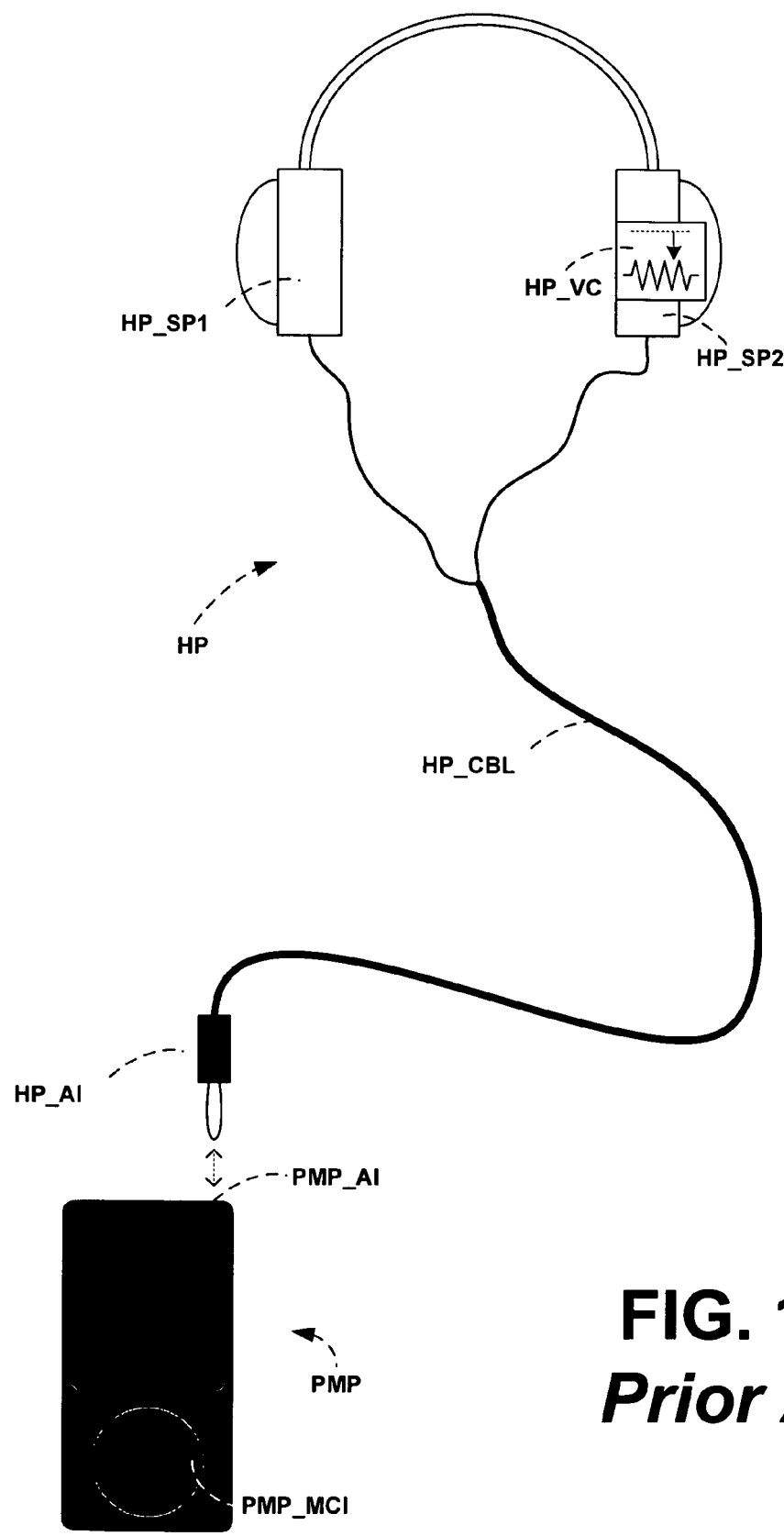

In consideration of such need in the art, the invention is a system that enables a cable, such as a headphone cable to be used as a human interface device. In other words, the cable itself is a supplemental input device which removes the need for any other remote control device, additional buttons, etc. For applications running on a computing device without an overly complex set of interactive controls, the cable input device of the invention may even wholly replace the main user interface control of a computing device. In addition to the existing portable device and device software/firmware, in various non-limiting embodiments, the invention includes the following components: (A) a pressure transducer and/or touch sensor that is integrated with (i.e., not separate from as in FIG. 1B) the headphone cable and takes input from the user, (B) an electronic interface between the headphone cable and the portable device, which can be integrated with a standard headphone jack, or provided as a separate component, (C) hardware/firmware electronics that convert an analog sensor signal received by the electronic interface to a digital signal and (D) algorithms that convert the digital pressure/touch signal to a simple representation of user actions for interpretation by an underlying operating system or application of the device to be controlled by the cable input device and (E) algorithms that map the user actions to playback control actions (typically the same control actions that are represented by the device software's main user interface controls).

While various embodiments herein are described herein in the context of a headphone cable for a portable media player, it should be understood that the invention can apply to any cable attached to and communicatively coupled to a computing device where it would be desirable to control one or more aspects of the operation of the computing device with the cable. For instance, the invention may be applied effectively for a phone headset, or to any other computing device in which a component accessible to the user is attached to the computing device via a cable.

Figure 2:
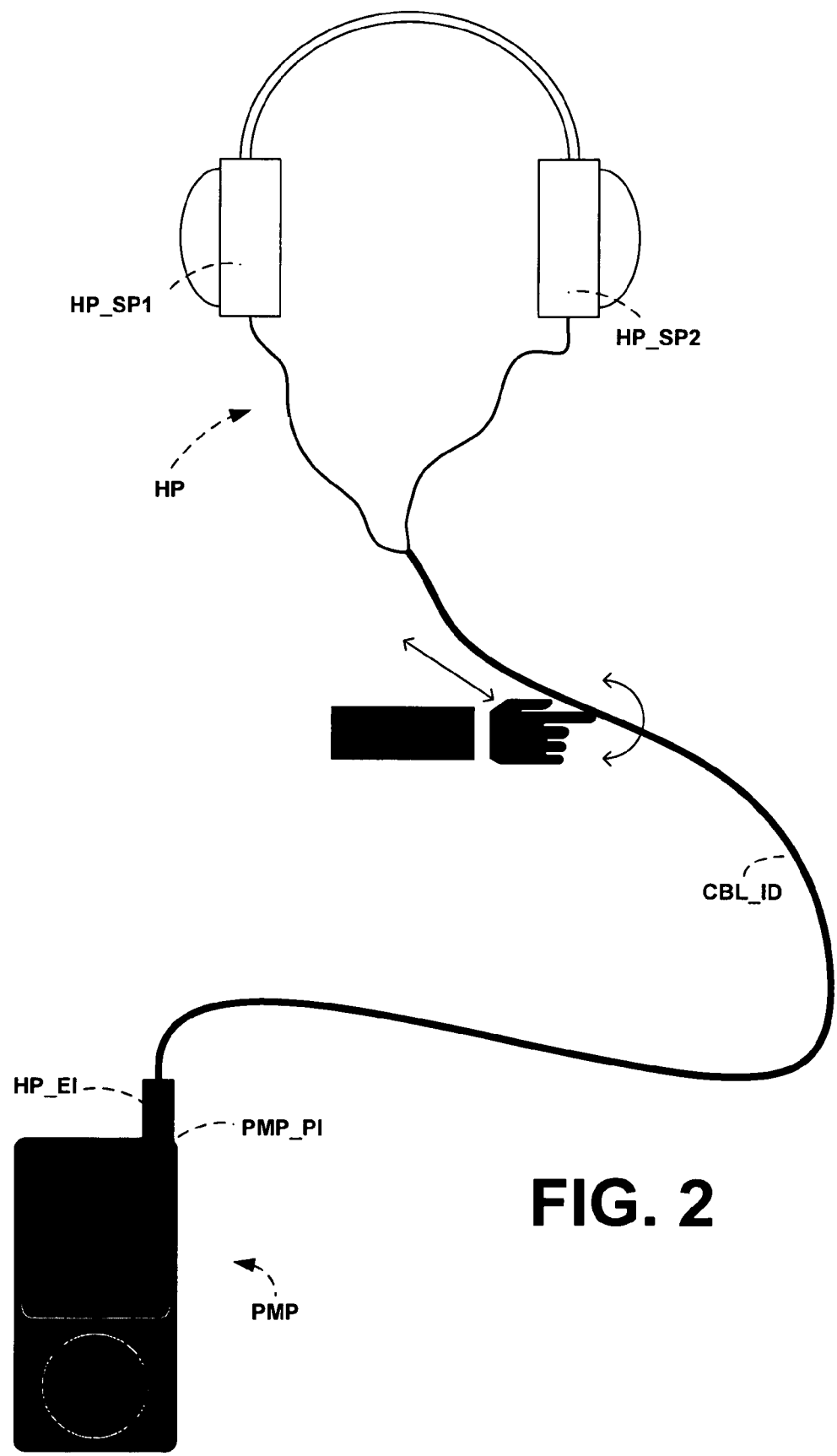
FIG. 2 illustrates an exemplary, non-limiting embodiment of a cable input device in accordance with the invention.

FIG. 2 illustrates an exemplary non-limiting embodiment showing a cable input device CBL_ID with electronic interface HP_EI in accordance with the invention. As shown, when a user interacts with the cable, by touching or otherwise exerting pressure on the cable, the pressure creates an analog signal that is received by the electronic interface HP_EI which is communicatively coupled to the computing device. The analog signal is communicated from the electronic interface HP_EI of the headphones to the electronic interface PMP_EI of the portable media player. The analog signal is then digitized and interpreted to understand what action (gesture or type of touching) the user performed.

For instance, as shown near the user's hand in FIG. 2, one common action might be sliding the user's finger, or fingers (including thumb), up or down the cable, thereby generating a signal. Another action might be rotating the user's finger(s) around the cable. Another gesture might be a press and hold with two fingers, or a grip and hold with the user's whole hand. Another gesture might be a double press (analogous to a double click), a triple press, or the like. In essence, any way that a user might uniquely touch the cable input device CBL_ID of the invention is contemplated as an input gesture.

Since each unique touching of the cable input device CBL_ID generates a signal that differs from other unique "touchings" of or interactions with the cable input device CBL_ID, it may be determined from the digital representation of the signal which of the possible unique touchings was performed by the user. Next, once it is understood what kind of touching gesture was made to the cable, the action is mapped to one or more existing control inputs (e.g., the play button or the fast forward control) of the application or device being controlled in accordance with pre-determined mappings for the application or device, and finally, the functionality normally carried out for such control input is performed. One of ordinary skill in the art can appreciate that the conversion to digital format is an implementation of convenience since purely analog implementations can be needlessly expensive and inflexible.

Figure 3A:
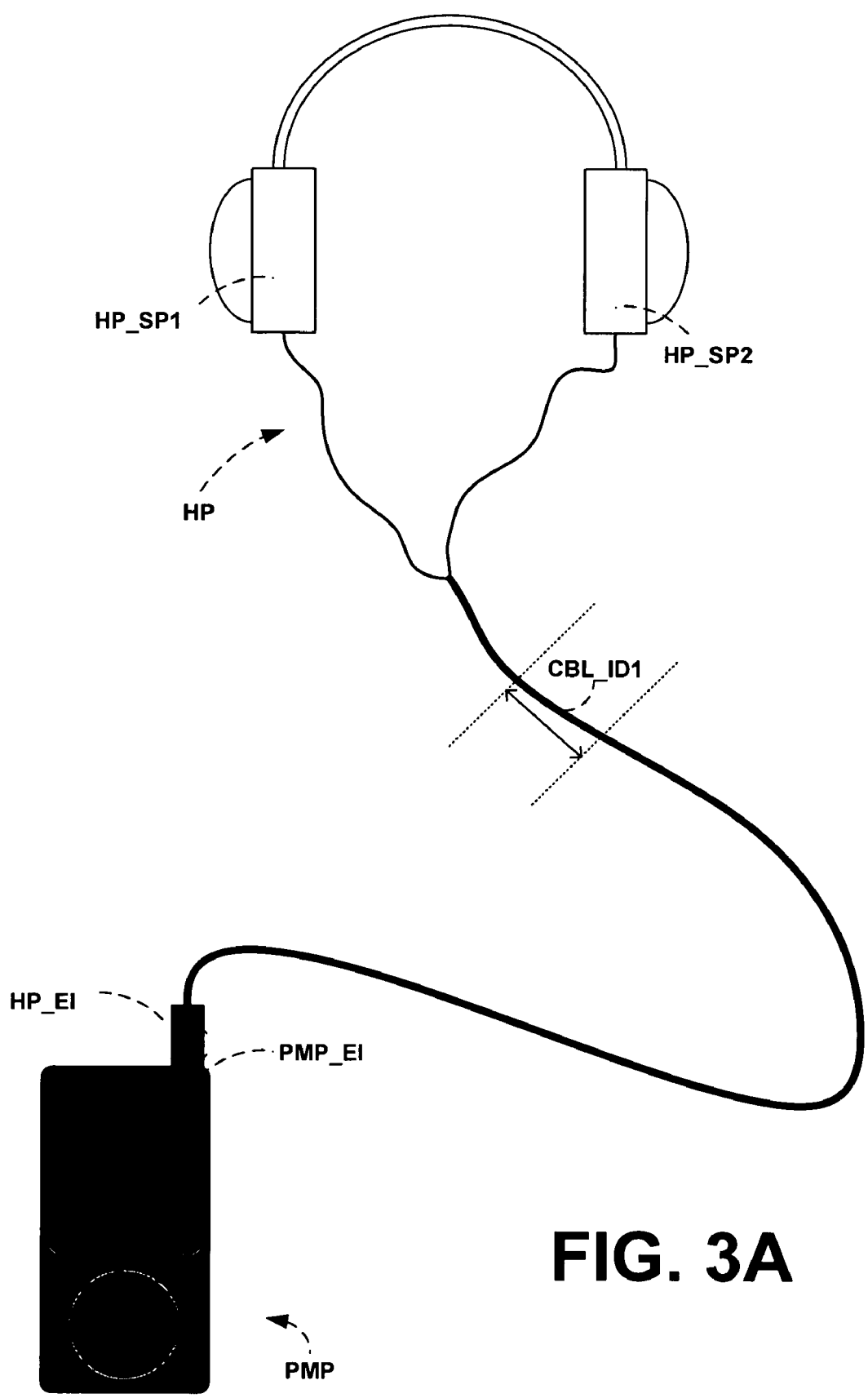
FIGS. 3A and 3B illustrate alternative exemplary, non-limiting embodiments of a cable input device in accordance with the invention.

In the embodiment of FIG. 2, the user is able to interact with the entire cable from the electronic interface HP_EI to the headset. However, as illustrated in FIG. 3A, this need not be the case. FIG. 3A illustrates that the cable can include a cable input device portion CBL_ID1, such that if the user touches or otherwise exerts pressure to a portion of the cable that is outside of the dotted lines, then nothing happens, either because software precludes interpretation of signals originating from such portions, or because no sensors are included in such portions. Interaction with the portion CBL_ID1, however, works as described in connection with FIG. 2.

Figure 3B:
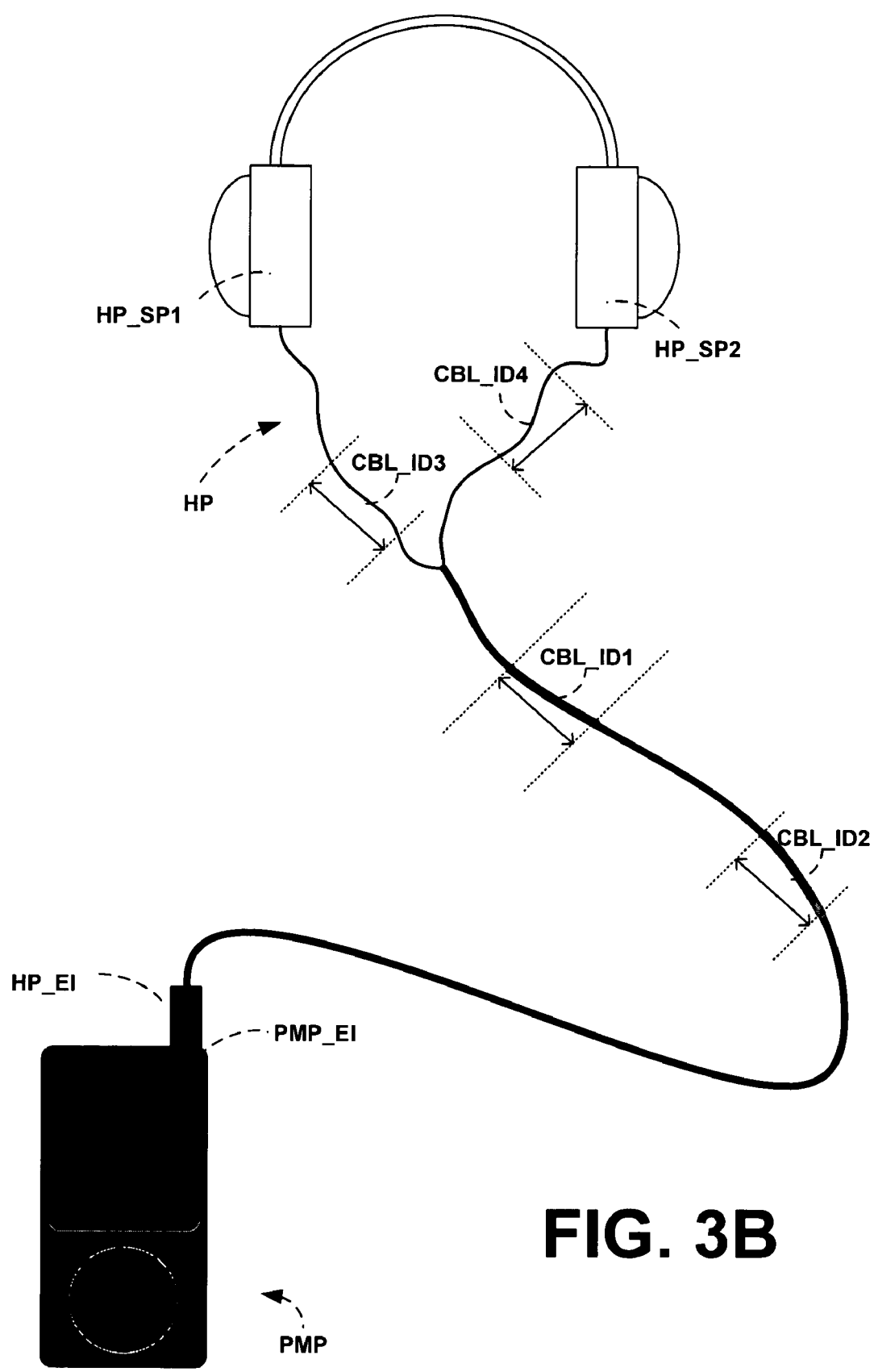

FIG. 3B further illustrates that even if the cable is divided, or branched at some point (e.g., for left and right stereo headphone channels), that the branched portions may also include a cable input device portion, such as portion CBL_ID3 or CBL_ID4, including pressure sensitive sensors in accordance with the invention. As shown, FIG. 3B also demonstrates that multiple portions of the cable CBL_ID1, CBL_ID2, CBL_ID3 and CBL_ID4 can be implemented as cable input devices in accordance with the invention. In one non-limiting embodiment, unique markings (such as color coding) or cable surface texture (e.g., indentations or bumps) indicate to a user which portions of the cable include pressure sensitive sensors.

Figure 4:
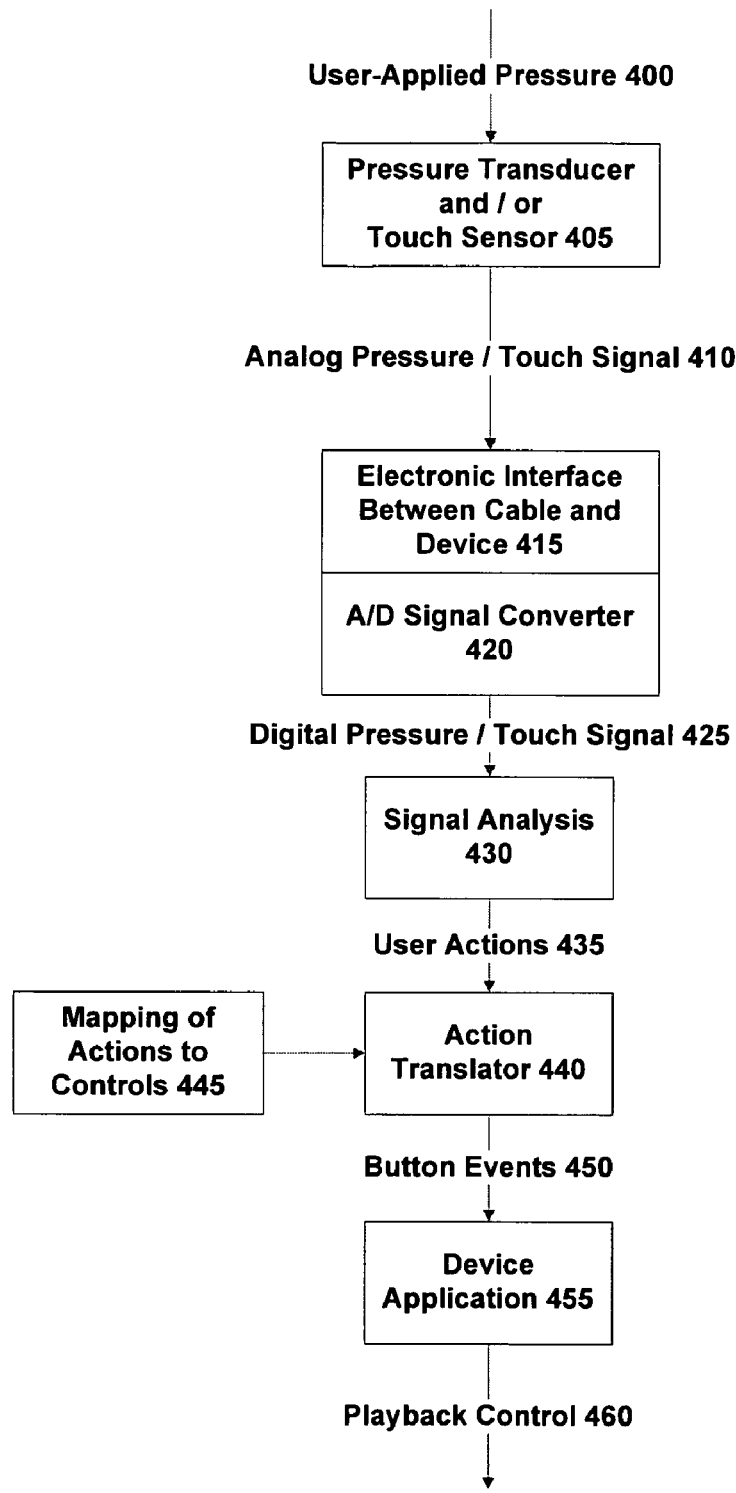
FIG. 4 is a block diagram illustrating the data processing flow that occurs in accordance with the invention when a user applies pressure to the cable input device of the invention.

FIG. 4 shows the processing flow that occurs when a user applies pressure to a cable input device of the invention. At 400, a user applies pressure or touch via a gesture to the cable input device (e.g., tap, press+hold, or slide). At 405, the pressure transducer(s) and/or touch sensor(s) that are integrated with the cable, and described in more detail below, receive the gesture. At 410, an analog signal is generated that is representative of the touching. At 415, the electronic interface between the cable and the device receives the analog signal. At 420, an analog to digital converter receives the analog signal for the purpose of converting the signal to a digital representation (or the electronic interface performs the A/D conversion prior to transmitting the signal to the device). Then, at 425, the signal is converted to digital form and output from the analog to digital converter. At 430, the digital signal is received by a signal analysis component and the signal analysis component analyzes the digital signal to determine whether any user action(s), which the signal analysis component is designed to notice within a signal, are represented within the signal received. If so, at 435, a set of user actions represented within the digital signal are created, and at 440, the set of user actions are input to an action translator. At 445, the action translator, in cooperation with a set of mappings that map the set of user actions to device specific control inputs, translates the user action(s) to control inputs that can be used to control the functionality of the application or device. At 450, such control inputs are generated, and input to the application or device at 455 (similar to how they would be received by the device or application if the user had interacted with the device via its main control user interface). Finally, at 460, the functionality associated with such control inputs is carried out by the device or application (e.g., volume up, or skip to next song, or switch to second caller via call waiting).

In a non-limiting embodiment, steps 420 to 460 are performed on the device side, though one of ordinary skill in the art can appreciate that some functionality can be moved outside the device too, either as part of the electronic interface, or as a separate component.

A variety of mechanisms may be utilized to implement pressure and/or touch sensing on a cable input device in accordance with the invention. For instance, in a capacitive embodiment, the entire cable can be implemented as a capacitive control. Depending on where the user touches the cable input device, varying levels of capacitance can be detected which indicate touch to the cable input device.

In a mechanical sleeve embodiment, the cable input device includes an additional wire, and a conductive, or semi-conductive sleeve. By squeezing the cable, the sleeve and wire make contact with each other, thereby completing a circuit like a simple mechanical switch.

In an inter-channel coupling embodiment, the cable input device includes a plurality of channels whereby one of the channels carries a high frequency signal (out of the audible range) such that when fingers pinch the cable, capacitive coupling to another channel occurs, which may be detected. For the avoidance of doubt, inter-channel coupling embodiments of the invention include, but are not limited to, the case where the plurality of channels comprise pre-existing channels, such as the left and right audio channels of a headset or headphones. In such a case, the high frequency signal(s) are carried on the same channels as the audio signal(s) for the left/right channels.

In a piezoelectric cable embodiment, the cable input device is implemented as a piezoelectric pressure sensor, such that mechanical action by the user is translated to a measurable electrical signal.

In a resistance difference embodiment, touching the cable itself varies a resistance being measured through the cable input device.

It can be appreciated that a combination of any one or more of the above embodiments, either in the same cable input device, or in separate cable input device portions, may be implemented depending on the application and complexity of functionality desired. Additionally, spacing between sensors can be varied as one progresses up or down the cable, so that different spacing characteristics yield different signal characteristics which give the signal analysis component a clue as to where a user touched the cable.

It can also be appreciated that some of the above-described embodiments may not be well suited to interpreting certain types of user gestures. For instance, in the inter-channel coupling embodiment described above, taps and press and hold gestures can be detected, but it is more difficult to detect any sliding up and down the cable using such a technique.

As mentioned in connection with FIGS. 3A and 3B, any of these mechanisms can be simplified if they are localized to a part of the cable. Moreover, it may make good functional sense to do so. For instance, in the headphones context, rarely will a user have ready access to the part of the cable near the device itself, since that is the part of the cable that is most likely to be away from the user. Thus, if only a portion that dangles near a user's neck, chest, or stomach includes a cable input device in accordance with the invention, then the user has ready access to the cable input device, while preventing unintended or inadvertent input to other parts of the cable from affecting control of the device. For instance, a cable input device can be implemented as the first 1-2 inches of the cable where it protrudes from the device, the last 1-2 inches of the cable where it terminates at the earphones, or at approximate 1-2 inches near chest height.

As mentioned, a variety of gestures can be supported, and combinations thereof, to control playback of a device via a cable input device in accordance with the invention. For embodiments that measure pressure/touch exerted by the user to the cable input device, gestures may include single press, multiple presses (double press, triple press, etc.), short press versus long press, as well as press and hold gestures. For embodiments that support touch, and its corresponding location on the cable input device, the invention may support gestures including fast swiping up the cable towards the headphone and fast swiping down the cable towards the device, as well as slow swiping up the cable towards the headphone and slow swiping down the cable towards the device.

The invention may also be embodied so that a combination of pressure (e.g., presses on the cable) and touch (e.g., position on the cable) can be used to provide input to the cable input interface of the invention. For example, the invention may include invoking pre-defined input functionality when a user applies a single press gesture followed by a swipe gesture, which can be different from functionality invoked from a single press gesture alone, or a single swipe gesture alone. For a non-limiting illustration, a single press gesture followed by a swipe up gesture may invoke "volume up" functionality, whereas if the user merely performs the swipe up gesture, without the single press, "scan forward in the song" functionality may be invoked, and if the user merely performs the single press gesture, yet another functionality (including no functionality) may be performed. Thus, pressure sensor input, touch sensor input and combined pressure and touch input can be mapped to different underlying functionalities for controlling the device.

Exemplary Networked and Distributed Environments

One of ordinary skill in the art can appreciate that the invention can be implemented in connection with any computer or other client or server device, which can be deployed as part of a computer network, or in a distributed computing environment, or which can be controlled by an input device. In this regard, the present invention pertains to any computer system or environment having any number of memory or storage units, and any number of applications and processes occurring across any number of storage units or volumes, which may be used in connection with controlling a computing device via a user interface in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may be controlled by a user interface of the present invention.

Figure 5A:
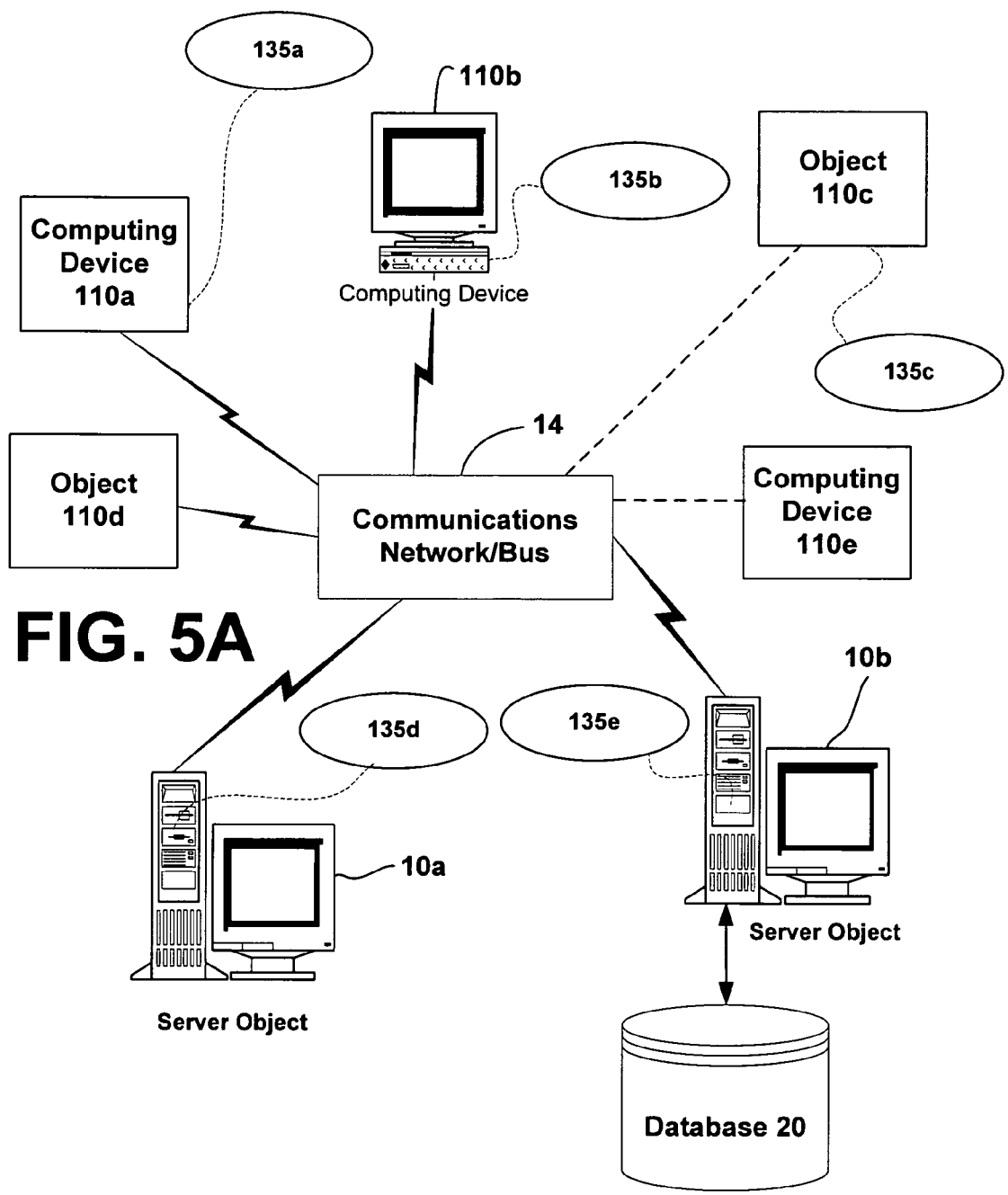
FIG. 5A is a block diagram representing an exemplary network environment in which the present invention may be implemented.

FIG. 5A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc., any one of which may be controlled by an embodiment of a user interface in accordance with the invention. Each object can communicate with another object by way of the communications network 14. This network may itself comprise other computing objects and computing devices that provide services to the system of FIG. 5A, and may itself represent multiple interconnected networks. In accordance with an aspect of the invention, each object 10a, 10b, etc. or 110a, 110b, 110c, etc. may contain an application that might make use of an API, or other object, software, firmware and/or hardware, suitable for use or communications with the input devices provided in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to controlling a computing device with a user interface according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, moving forward, computing devices will require ways of sharing data, such as data accessed, processed or utilized incident to program objects and interfaces, the operation of which may be implicated by input received in accordance with the invention.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 5A, as an example, computers 110a, 110b, etc. can be thought of as clients and computers 10a, 10b, etc. can be thought of as servers where servers 10a, 10b, etc. maintain the data that is then replicated to client computers 110a, 110b, etc., although any computer can be considered a client, a server, or both, depending on the circumstances. Any of these computing devices may be processing data or requesting services or tasks that may be implicated according to user input received by an input device in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 5A illustrates an exemplary networked or distributed environment, with server(s) in communication with client computer (s) via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like, any of which may include or be controlled by the input devices in accordance with the present invention. It is thus contemplated that the present invention may apply to any computing device with which a human being may interact.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

As mentioned, communications may be wired or wireless, or a combination, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed or saved according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 5B:
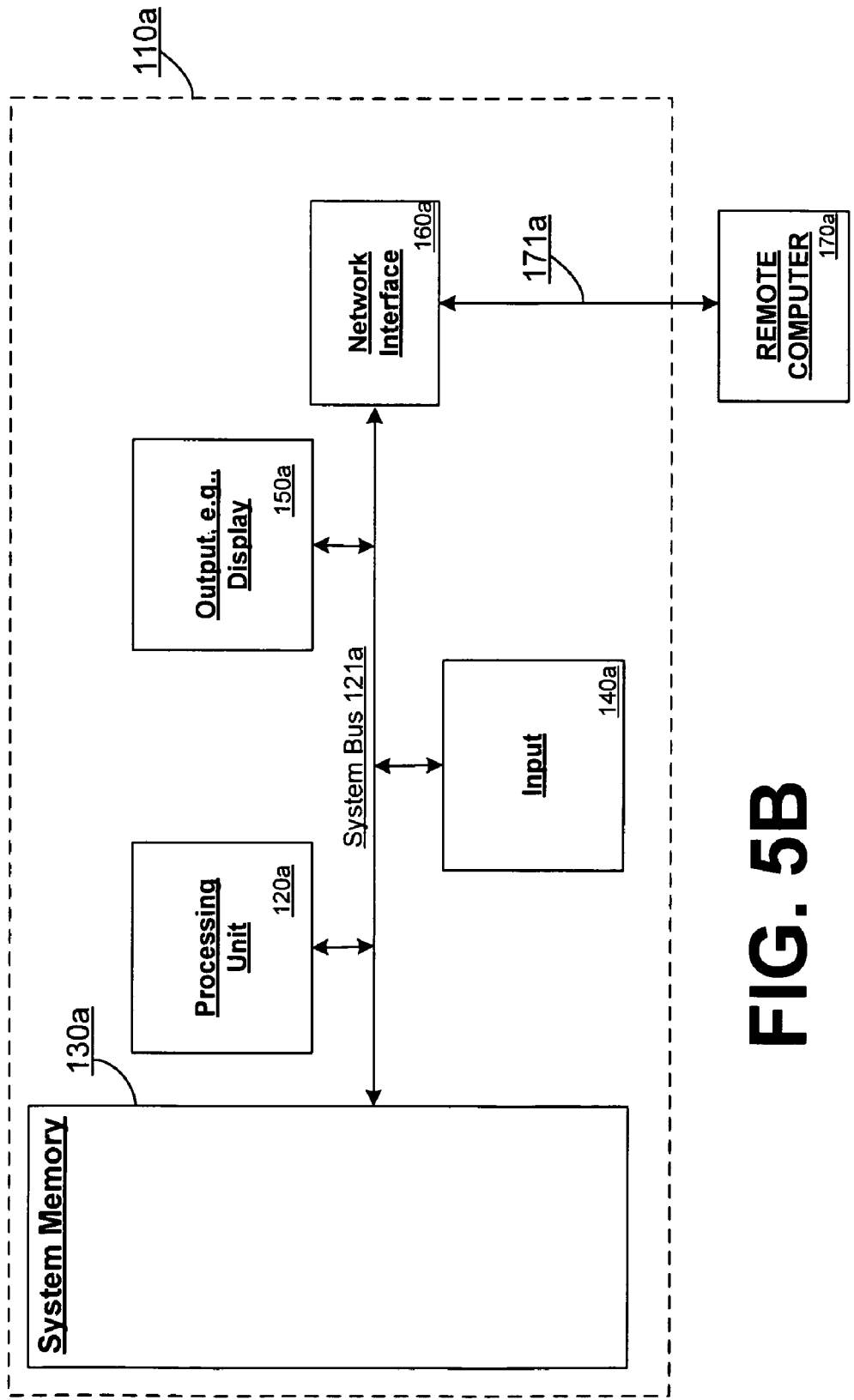
FIG. 5B is a block diagram representing an exemplary non-limiting computing system environment in which the present invention may be implemented.

As mentioned, the invention applies to any device wherein it may be desirable to include a hardware user interface for receiving input from a human being. It should be understood, therefore, that handheld, portable and other computing devices and computing objects of all kinds are contemplated for use in connection with an input device of the present invention. Accordingly, the below general purpose remote computer described below in FIG. 5B is but one example, and the present invention may be implemented with any client or portable device, whether standalone or having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the user interface component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 5B thus illustrates an example of a suitable computing system environment 100a in which the invention may be implemented, although as made clear above, the computing system environment 100a is only one example of a suitable computing environment for an input device and is not intended to suggest any limitation as to the scope of use or functionality of the invention. Neither should the computing environment 100a be interpreted as having any dependency or requirement relating to any one or combination of components illustrated in the exemplary operating environment 100a.

With reference to FIG. 5B, an exemplary remote device for implementing the invention includes a general purpose computing device in the form of a computer 110a. Components of computer 110a may include, but are not limited to, a processing unit 120a, a system memory 130a, and a system bus 121a that couples various system components including the system memory to the processing unit 120a. The system bus 121a may be any of several types of bus structures including a memory bus or memory controller, a peripheral bus, and a local bus using any of a variety of bus architectures.

Computer 110a typically includes a variety of computer readable media. Computer readable media can be any available media that can be accessed by computer 110a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110a. Communication media typically embodies computer readable instructions, data structures, program modules or other data in a modulated data signal such as a carrier wave or other transport mechanism and includes any information delivery media.

The system memory 130a may include computer storage media in the form of volatile and/or nonvolatile memory such as read only memory (ROM) and/or random access memory (RAM). A basic input/output system (BIOS), containing the basic routines that help to transfer information between elements within computer 110a, such as during start-up, may be stored in memory 130a. Memory 130a typically also contains data and/or program modules that are immediately accessible to and/or presently being operated on by processing unit 120a. By way of example, and not limitation, memory 130a may also include an operating system, application programs, other program modules, and program data.

The computer 110a may also include other removable/non-removable, volatile/nonvolatile computer storage media. For example, computer 110a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 121a through a non-removable memory interface such as an interface, and a magnetic disk drive or optical disk drive is typically connected to the system bus 121a by a removable memory interface, such as an interface.

In addition to a user interface according to the invention, a user may enter commands and information into the computer 110a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 120a through user input 140a and associated interface(s) that are coupled to the system bus 121a, but may be connected by other interface and bus structures, such as a parallel port, game port or a universal serial bus (USB). A graphics subsystem may also be connected to the system bus 121a. A monitor or other type of display device is also connected to the system bus 121a via an interface, such as output interface 150a, which may in turn communicate with video memory. In addition to a monitor, computers may also include other peripheral output devices such as speakers and a printer, which may be connected through output interface 150a.

The computer 110a may operate in a networked or distributed environment using logical connections to one or more other remote computers, such as remote computer 170a, which may in turn have media capabilities different from device 110a. The remote computer 170a may be a personal computer, a server, a router, a network PC, a peer device or other common network node, or any other remote media consumption or transmission device, and may include any or all of the elements described above relative to the computer 110a. The logical connections depicted in FIG. 5B include a network 171a, such local area network (LAN) or a wide area network (WAN), but may also include other networks/buses. Such networking environments are commonplace in homes, offices, enterprise-wide computer networks, intranets and the Internet.

When used in a LAN networking environment, the computer 110a is connected to the LAN 171a through a network interface or adapter. When used in a WAN networking environment, the computer 110a typically includes a modem or other means for establishing communications over the WAN, such as the Internet. A modem, which may be internal or external, may be connected to the system bus 121a via the user input interface of input 140a, or other appropriate mechanism. In a networked environment, program modules depicted relative to the computer 110a, or portions thereof, may be stored in a remote memory storage device. It will be appreciated that the network connections shown and described are exemplary and other means of establishing a communications link between the computers may be used.

Exemplary Interface Implementations

For any exchange of data among multiple computers, such as between an input device of the invention and a corresponding device or component the input device is meant to control, there are interfaces for handling the various operations on each computer that can be implemented in hardware and/or software and which operate to receive, send and/or process the data in some fashion, according to the relevant applications and services being requested or provided. To the extent that one or more interface objects may be provided to achieve or implement any portion of the input devices provided in accordance with the invention, the invention is intended to encompass all such embodiments, and thus a general description of the kinds of interfaces that might be provided or utilized when implementing or carrying out the invention, as follows.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 6A:
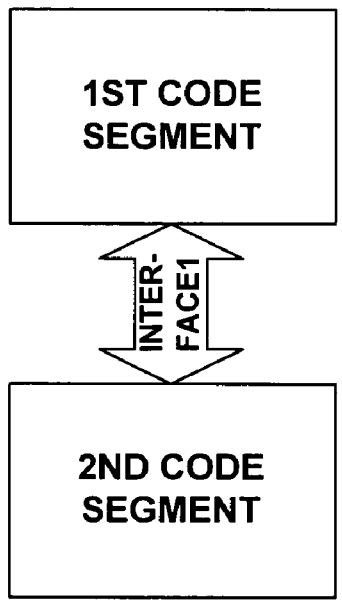
FIGS. 6A, 6B, 7A, 7B, 8A, 8B, 9A, 9B, 10A, 10B, 11A, and 11B illustrate exemplary ways in which similar interface code can be provided to achieve similar or equivalent objective(s) of any interface(s) in accordance with the invention.
Figure 6B:
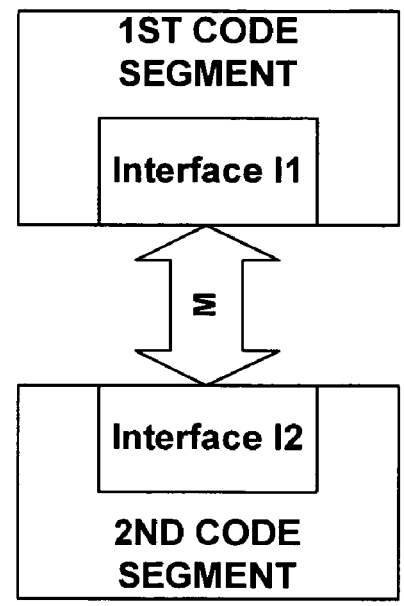

Notionally, a programming interface may be viewed generically, as shown in FIG. 6A or FIG. 6B. FIG. 6A illustrates an interface Interface1 as a conduit through which first and second code segments communicate. FIG. 6B illustrates an interface as comprising interface objects I1 and I2 (which may or may not be part of the first and second code segments), which enable first and second code segments of a system to communicate via medium M. In the view of FIG. 6B, one may consider interface objects I1 and I2 as separate interfaces of the same system and one may also consider that objects I1 and I2 plus medium M comprise the interface. Although FIGS. 6A and 6B show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 6A and 6B, but they nonetheless perform a similar function to accomplish the same overall result. We will now briefly describe some illustrative alternative implementations of a programming interface.

A. Factoring

Figure 7A:
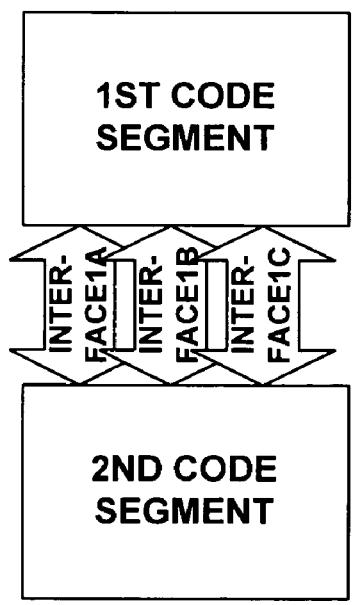
Figure 7B:
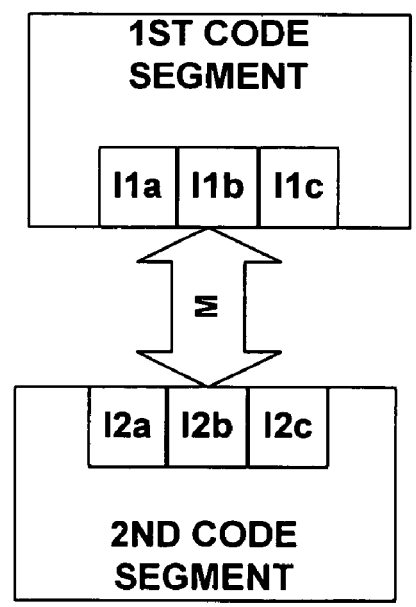

A communication from one code segment to another may be accomplished indirectly by breaking the communication into multiple discrete communications. This is depicted schematically in FIGS. 7A and 7B. As shown, some interfaces can be described in terms of divisible sets of functionality. Thus, the interface functionality of FIGS. 6A and 6B may be factored to achieve the same result, just as one may mathematically provide 24, or 2 times 2 time 3 times 2. Accordingly, as illustrated in FIG. 7A, the function provided by interface Interface1 may be subdivided to convert the communications of the interface into multiple interfaces Interface 1A, Interface 1B, Interface 1C, etc. while achieving the same result. As illustrated in FIG. 7B, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the $1^{st}$ code segment need not match the number of interfaces included with the $2^{nd}$ code segment. In either of the cases of FIGS. 7A and 7B, the functional spirit of interfaces Interface1 and I1 remain the same as with FIGS. 6A and 6B, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 8A:
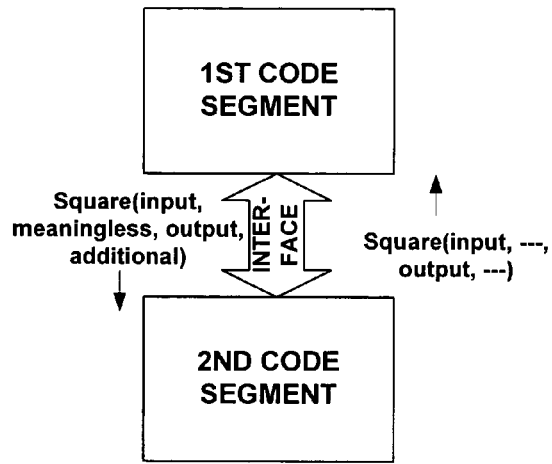
Figure 8B:
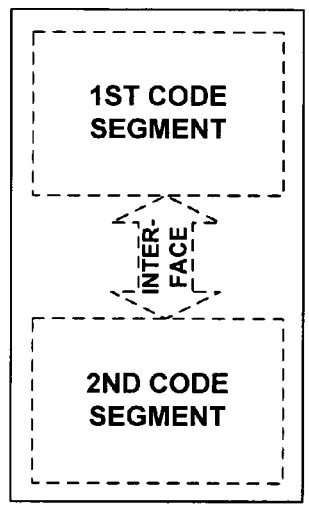

In some cases, it may be possible to ignore, add or redefine certain aspects (e.g., parameters) of a programming interface while still accomplishing the intended result. This is illustrated in FIGS. 8A and 8B. For example, assume interface Interface1 of FIG. 6A includes a function call Square (input, precision, output), a call that includes three parameters, input, precision and output, and which is issued from the $1^{st}$ Code Segment to the $2^{nd}$ Code Segment., If the middle parameter precision is of no concern in a given scenario, as shown in FIG. 8A, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 8B, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, that are not needed for some purpose, and so they may be ignored or redefined, or processed elsewhere for other purposes.

C. Inline Coding

Figure 9A:
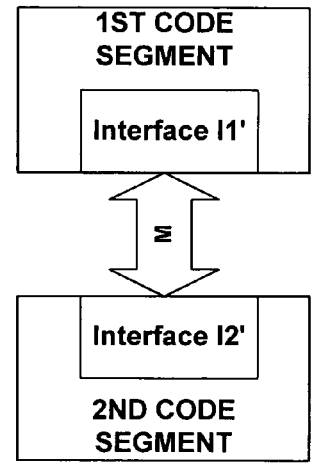
Figure 9B:
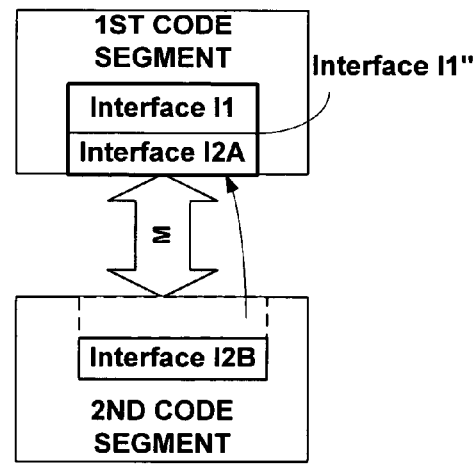

It may also be feasible to merge some or all of the functionality of two separate code modules such that the "interface" between them changes form. For example, the functionality of FIGS. 6A and 6B may be converted to the functionality of FIGS. 9A and 9B, respectively. In FIG. 9A, the previous $1^{st}$ and $2^{nd}$ Code Segments of FIG. 6A are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 9B, part (or all) of interface I2 from FIG. 6B may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 6B performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 10A:
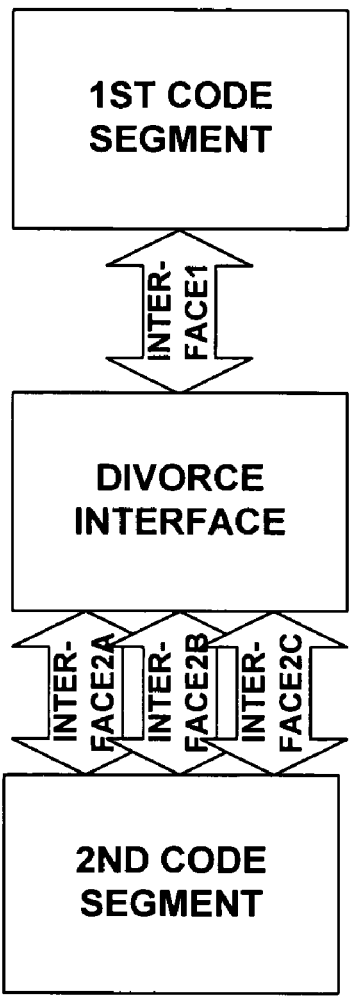
Figure 10B:
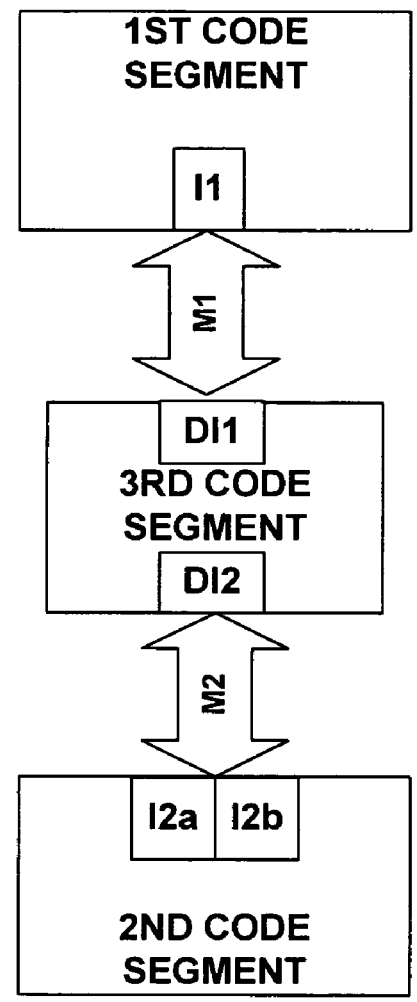

A communication from one code segment to another may be accomplished indirectly by breaking the communication into multiple discrete communications. This is depicted schematically in FIGS. 10A and 10B. As shown in FIG. 10A, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the $2^{nd}$ Code Segment is changed such that it is no longer compatible with the interface used by the $1^{st}$ Code Segment, and so an intermediary is used to make the old and new interfaces compatible. Similarly, as shown in FIG. 10B, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 6B to a new operating system, while providing the same or similar functional result.

E. Rewriting

Figure 11A:
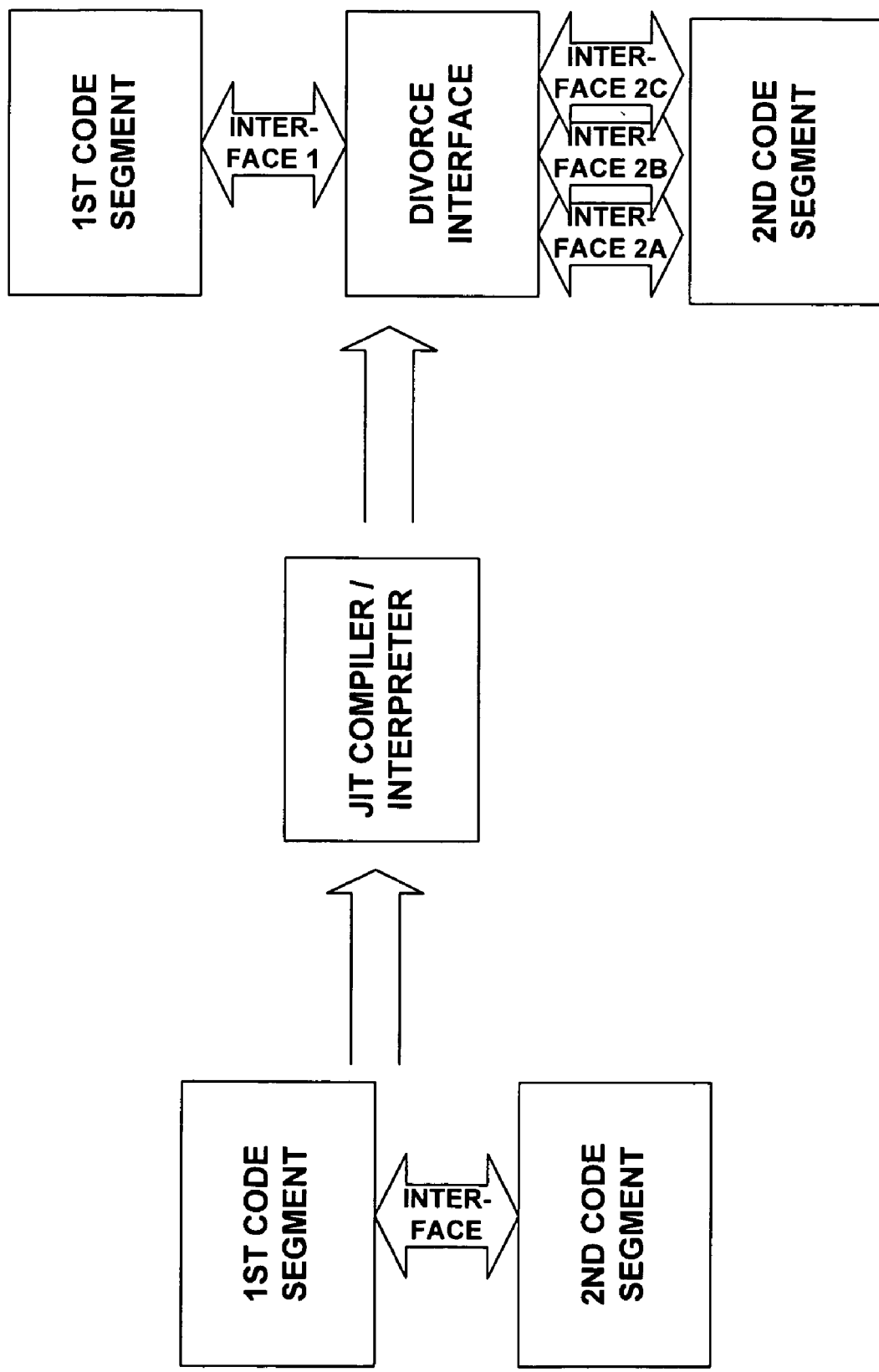
Figure 11B:
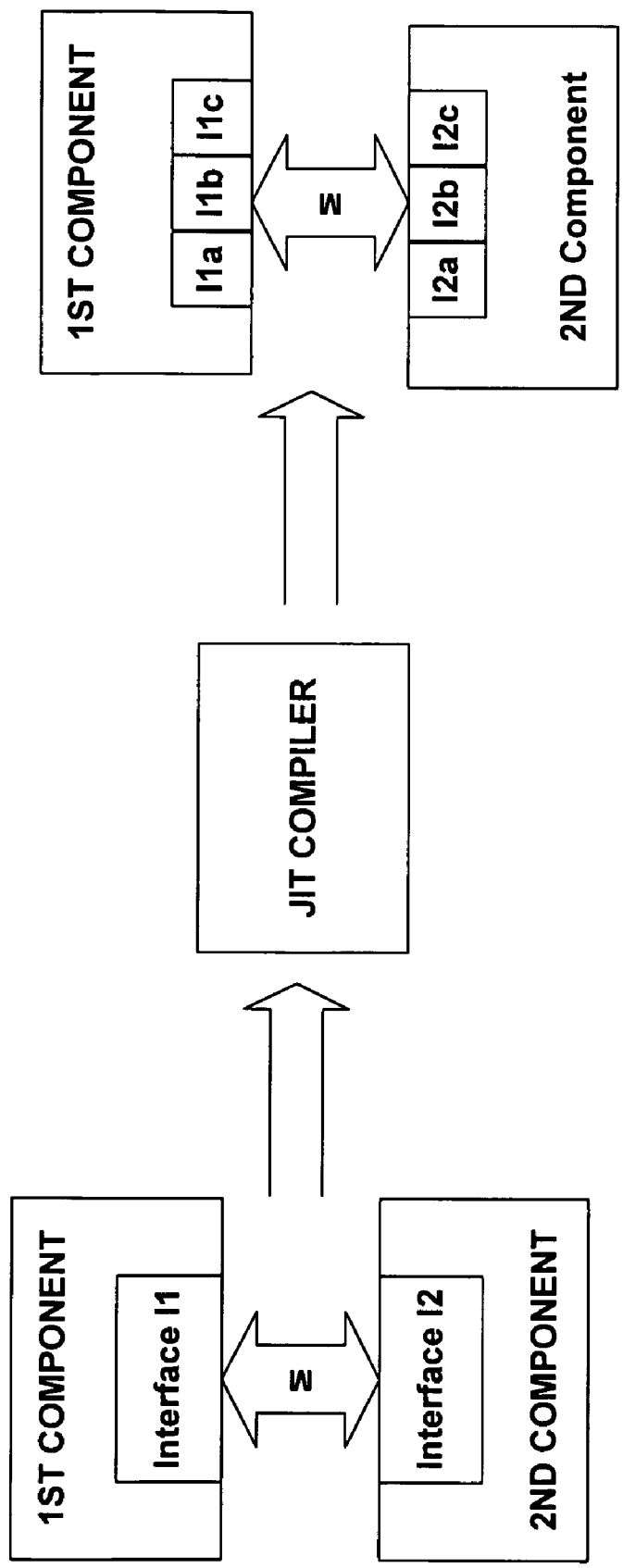

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the $1^{st}$ Code Segment to the $2^{nd}$ Code Segment, i.e., to conform them to a different interface as may be required by the $2^{nd}$ Code Segment (either the original or a different $2^{nd}$ Code Segment). This is depicted in FIGS. 11A and 11B. As can be seen in FIG. 11A, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 11B, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 6A and 6B. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

There are multiple ways of implementing the present invention, e.g., an appropriate API, tool kit, driver code, operating system, control, standalone or downloadable software object, etc. which enables applications and services to use an input device provided according to the invention. The invention contemplates the use of the invention from the standpoint of an API (or other software object), either on a host device being controlled by an input device of the invention where the input device operates as a remote control, or on the input device itself. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which an input device may be utilized to control the device or system. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. FIG. 4 illustrates one way of implementing an algorithmic flow for determining an input in accordance with the invention; however, one of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize any software provided in accordance with the invention are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network.

Furthermore, it should be emphasized that a variety of computer platforms, including handheld device operating systems and other application specific operating systems are contemplated, especially as the number of wireless networked devices continues to proliferate. Still further, functionality of the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. An apparatus for controlling a computing device, comprising:
    a cable communicatively coupled to the computing device comprising:
        a signal carrying wire configured to transmit signals from or receive signals at the computing device;
        a touch/pressure sensitive sensor within the cable configured to detect a plurality of unique touches each having a different respective functionality; and
        an interface for interfacing with the computing device and interacting with the touch/pressure sensitive sensor to generate a control input for controlling the computing device, the interface comprising:
            a signal analysis component to analyze the signals from the cable sensitive sensor to determine a first unique touch represented by the signals; and
            an action translator that translates the signal analysis into the control input,
        the touch/pressure sensitive sensor including at least a first channel and a second channel, the first channel carrying a high frequency signal that capacitively couples with the second channel when a user exerts pressure to the cable, the second channel delivering the high frequency signal to the signal analysis component only upon capacitive coupling with the first channel, the signal analysis component analyzing the coupled high frequency signal from the second channel.

2. An apparatus according to claim 1, wherein the computing device is a portable media player or a cell phone.

3. An apparatus according to claim 1, wherein interacting with the touch/pressure sensitive sensor generates volume control input for controlling the amplitude of audio output from the computing device.

4. A method for receiving user input from a user via a cable user interface component, comprising:
    receiving a first unique touch by the user that interacts with the cable user interface component, the cable user interface component including a touch/pressure sensitive sensor integrated with a cable, the cable user interface component configured to detect a plurality of unique touches each having a different respective functionality;
    generating a signal by at least one of the touch/pressure sensitive sensors based on the first unique touch, said signal is utilized to control a functional aspect of a computing device;
    analyzing by a signal analysis component the signal from the cable to determine the first unique touch represented by the signal; and
    translating by an action translator the signal analysis into a control input to the computing device
    the touch/pressure sensitive sensor including at least a first channel and a second channel, the first channel carrying a high frequency signal that capacitively couples with the second channel when a user exerts pressure to the cable, the second channel delivering the high frequency signal to the signal analysis component only upon capacitive coupling with the first channel, the signal analysis component analyzing the coupled high frequency signal from the second channel.

5. A method according to claim 4, further comprising:
transmitting the signal to the computing device for the purpose of controlling the computing device.

6. A method according to claim 4, further comprising:
wherein said generating includes generating a signal by the touch/pressure sensitive sensor based on the first unique touch, wherein said signal is utilized to control the volume of audio output from the computing device.

7. A method according to claim 4, further including:
analyzing the signal to determine whether the first unique touch represents at least one pre-defined action;
if the first unique touch represents at least one pre-defined action, controlling the computing device in accordance with a functionality associated with the at least one pre-defined action.

8. A method according to claim 7, further comprising mapping the at least one pre-defined action to at least one pre-existing control input of the computing device.

9. A method according to claim 7, wherein the at least one pre-defined action is any of a single press of short duration, a single press of a duration longer than the short duration, a double press, a triple press, and a press and hold action.

10. A method according to claim 7, wherein the at least one pre-defined action is any of a fast swiping up the cable user interface component, a fast swiping down the cable user interface component, a swiping up the cable slower than the fast swiping and a swiping down the cable slower than the fast swiping.

11. A method according to claim 7, wherein the at least one pre-defined action is any combination of at least one press and at least one swiping motion.

12. A method according to claim 4, wherein said signal is an analog signal and the method further includes:
converting the analog signal to a digital signal that digitally represents the analog signal.

13. A computer readable storage medium excluding signals having stored thereon computer executable instructions comprising:
receiving a first unique touch by a user that interacts with a cable user interface component, the cable user interface component including a touch/pressure sensitive sensor integrated with a cable, the cable user interface component configured to detect a plurality of unique touches each having a different respective functionality;
generating a signal by at least one of the touch/pressure sensitive sensors based on the first unique touch, said signal is utilized to control a functional aspect of a computing device;
analyzing by a signal analysis component the signal from the cable to determine the first unique touch represented by the signal; and
translating by an action translator the signal analysis into a control input to the computing device
the touch/pressure sensitive sensor including at least a first channel and a second channel, the first channel carrying a high frequency signal that capacitively couples with the second channel when a user exerts pressure to the cable, the second channel delivering the high frequency signal to the signal analysis component only upon capacitive coupling with the first channel, the signal analysis component analyzing the coupled high frequency signal from the second channel.

* * * * *